Patented Sept. 1, 1925.

1,551,997

UNITED STATES PATENT OFFICE.

FRANK A. McDERMOTT, OF WILMINGTON, DELAWARE, ASSIGNOR TO E. I. DU PONT DE NEMOURS & COMPANY, OF WILMINGTON, DELAWARE, A CORPORATION OF DELAWARE.

PROCESS OF PRODUCING GLYCEROL BY FERMENTATION.

No Drawing. Application filed August 25, 1920. Serial No. 405,930.

*To all whom it may concern:*

Be it known that I, FRANK A. McDERMOTT, a citizen of the United States, and a resident of Wilmington, in the county of New Castle and State of Delaware, have invented a certain new and useful Process of Producing Glycerol by Fermentation, of which the following is a specification.

This invention relates to the production of glycerol, and comprises the alkaline fermentation of a fermentable sugar solution with a certain variety of yeast.

The general procedure for producing glycerol by subjecting a wort containing a fermentable sugar to the action of a yeast in an alkaline medium, has been described in U. S. Patent No. 1,288,398, granted to John R. Eoff, Jr. in the course of an extensive investigation of this process for the purpose of increasing the efficiency of the fermentation, I have discovered that by employing a particular variety of yeast, not heretofore used in this connection, the fermentation may be completed in about half the time which is ordinarily consumed when the process is carried out according to the specification of the above mentioned patent.

This yeast which I preferably employ in my improved fermentation process is a strain which has been used to some extent in American grain distilleries. In order to facilitate its identification, the characteristics of this yeast may be set forth as follows:—

Morphology.

Typical cells, in media of 5 to 20% concentration of sugar, ovoid or elliptical, length 1.25 to 1.5 times diameter; nearly spherical cells, and long, narrow cells, length two to three times the diameter, fairly numerous. Cells in 50% sucrose solution, practically all nearly or actually spherical; very few if any long cells. Old cultures in low concentration media show a few very long, narrow, sausage-shaped cells. Average size of normal cells, about 6 x 8µ.

Cultural characteristics.

Cultures on sugar agar; moist, shining, smooth, edges entire, radial lines rare, and concentric growth rings almost indistinguishable.

Cultures on sugar gelatin; moist, shining, smooth, edges minutely serate, concentric growth rings distinguishable, but not well defined. Gelatin not liquefied in ten days at 20–25° C.

Contour of growth on both media, umbonate.

Grows and ferments actively in liquid media containing sugars (see below), nitrogenous nutrients, and appropriate mineral salts; e. g., grape juice, malt extract, peptone-sucrose solution, dextrose bouillon, dilute molasses, etc.

No film formation on liquid media.

Fermentation reactions.

The following sugars are actively fermented:—Sucrose, maltose, dextrose, levulose.

The following sugars are slightly fermented:—Galactose, inulin, raffinose (very slightly).

The following are not fermented:—Lactose, mannitol.

As would be indicated by these results, grape-juice and malt extract solutions are fermented, while milk is not fermented.

The yeast can utilize for its nitrogen metabolism, the nitrogenous compounds in malt and malt sprout extracts, peptone, amino-acids, and ammonium salts; of the latter especially the chloride, sulfate and phosphate.

Cane sugar is fermentable in all concentrations up to and including 50% by weight of the solution, and possibly higher concentrations.

Temperature limits for both growth and fermentation.

Minimum, in both liquid and solid media, below 10° C.

Optimum, 33° C. (30 to 35°).

Maximum, still produces slight fermentation at 42° C.

Thermal death point, above 60° C. (probably 65 to 68° C).

Alcohol tolerance.

Will produce up to and probably well over 9.0% by volume of ethyl alcohol.

The addition of 1.5 cc. of 95% by volume alcohol to 20 cc. of 5.0% dextrose solution containing nutrients, added immediately after inoculation with 0.25 cc. of a suspension of an active culture from grape juice, is sufficient to prevent the initiation of fermentation (equivalent to 4.2% by weight).

*Principal products of fermentation at 30° to 36° C.*

In acid solution:—Ethyl alcohol (45.0% of sugar fermented), carbon dioxide, glycerol (about 3% of the sugar fermented), acetaldehyde, trace; fusel oil.

In alkaline solution:—Ethyl alcohol (35% or more of sugar fermented), carbon dioxide, glycerol (up to at least 20% of the sugar fermented), acetic acid (up to 6.67% of the sugar fermented), acetaldehyde, fusel oil.

*Hydrogen-ion concentration limits.*

From $P_H$ 3. to about $P_H$ 8.5

*Spore formation.*

Very few spores formed in liquid media at ordinary room or ice-box temperatures. No spores on plaster block in 24–48 hours at 20–25° C.

The above-described yeast, which I shall arbitrarily designate "yeast No. 16", has a cell form which indicates that the yeast is related to the *cerevisiae* group as distinguished from the *ellipsoideus* group, and the very slight fermentation of raffinose would probably be sufficient to distinguish it from the low fermentation beer yeasts if the other characteristics were not sufficient for this purpose.

The procedure to be followed in carrying out the fermentation with yeast No. 16 may, in general, be the same as that described in the above mentioned Patent 1,288,398, one of the essential conditions being the maintenance of a certain degree of alkalinity in the wort. This alkalinity is brought about by the addition, at intervals, of small amounts of an alkali, preferably an alkali-metal carbonate, to the mash undergoing fermentation. The addition of the alkali should preferably be completed within from twelve to twenty-four hours from the start of the fermentation, and should be divided into four or more doses.

To illustrate my invention in greater detail the following example is given:—

A mash is made up of eighteen gallons of black-strap molasses dissolved in sufficient water to give a final volume of seventy-five gallons. Eight gallons of this solution are removed for use as seed culture, and both this and the remainder of the original solution are sterilized by boiling. To the seeding solution before boiling is added say one ounce of ammonium sulphate, and to the balance of the solution ten ounces of ammonium sulphate. To the seeding solution after cooling to 86° F. (30° C.) is added a starter consisting of one-third gallon of a molasses solution of the same concentration as the seeding solution, which has been inoculated with an active culture of yeast #16 in grape juice, malt extract solution, or other nutrient medium. When fermentation has been in progress for about seven hours in this seeding solution there is added to it about four ounces of anhydrous sodium carbonate, either solid or in 40% solution in water.

Fermentation ceases for a period up to about one hour in duration. Six hours or less after it has revived the seeding solution is added to the main mash. To this final mash plus the seeding solution, about 26¾ pounds of sodium carbonate (either anhydrous or in 40% solution) is added in five doses, each containing from 3 to 8 pounds of sodium carbonate (i. e. from about 3 to 8.5% of the weight of the fermentable sugar initially present), at about three-hour intervals. Fermentation resumes in one to two hours after the last dose of soda, and is complete in from 48 to 96 hours (on an average, about 60 hours) from the time of adding the seed solution to the main mash. The alcohol and glycerol in the fermented mash may be recovered in various ways, as by fractional distillation, which form no part of my invention.

The addition of soda in solution should preferably be avoided unless absolutely essential, as a decreased yield of glycerine is apt to result from the consequent dilution of the mash. The amount of carbonate in successive doses preferably increases from the first to the third dose, and then decreases from the third to the fifth dose.

From such a fermented mash there may be recovered, in terms of the sugar in the molasses, by the known methods of distillation, etc., the following quantities of products;

Alcohol—35% to 45%.
Glycerine—15% to 25%.

The ratio between these figures may be varied by varying the proportion of added soda, less soda giving higher alcohol and less glycerine.

The fermenting mash is preferably kept at a temperature of 86 to 91° F. (30 to 33° C.), but may be varied between 73 to 100° F. (22 to 38° C.) if conditions of operation require it. The sodium carbonate may be replaced in whole or in part with potassium carbonate. Other alkaline-reacting substances have not been found to give as good results; the hydroxides of sodium and potassium may be used, but in smaller amounts and with much greater care and attention during their addition.

As sources of sugar, the various grades of molasses may be replaced by commercial cane and beet sugars, the commercial preparations of dextrose and invert sugar such as "cerelose", "hydral", "nulomoline", and confectioners' and refiners' sirups, or by sugar from raisins or other fruits, or by sugar from starch or starch-containing raw materials or from sawdust or other cellulose-containing materials which have been so hydrolyzed as to yield dextrose or levulose. I do not limit myself to the specific proportions of alkali given, or to the intervals indicated between the additions of the different portions of doses, or to the number of doses (5) given above.

The molasses solution to be fermented may vary in balling (or brix) up to 30°, but about 25° is preferred. The solutions used with other sources of sugar vary in balling (or brix) in accordance with their content of fermentable sugar, which is preferably between 15 and 16% in the final mash. The weight of the soda used in the above example has been calculated on the basis of the weight of the entire mash, but is actually governed by the percentage of fermentable sugar and free acidity present in the mash as made up. As indicated above the proportion between the products of the fermentation may be controlled to a certain extent by varying the amount of added soda, and in my experimental work this has actually been varied between the limits of 3 and 5% of the weight of the molasses mash containing about 15.5% by weight of sugar. The soda may be added within periods of from twelve to twenty-four hours, but the sooner the adding of the soda is completed the better yield of glycerine

I claim:—

1. The process of producing glycerol which comprises fermenting, with the hereinbefore described yeast No. 16, a solution of fermentable sugar in an alkaline reacting medium.

2. In the process of producing glycerol by fermenting a solution of fermentable sugar while maintaining said solution alkaline by successive additions of small portions of an alkaline-reacting substance, the step which comprises effecting said fermentation by the hereinbefore described yeast No. 16.

3. The process of producing glycerol which comprises preparing a seeding solution by inducing fermentation in a solution of a fermentable sugar with the hereinbefore described yeast No. 16, adding said seeding solution while it is undergoing vigorous fermentation to a molasses mash whose concentration is between 20 and 30° balling, and, after vigorous fermentation has become established, rendering the mash alkaline by successive additions of small amounts of an alkali-metal carbonate.

4. The process of producing glycerol which comprises inducing a vigorous fermentation by means of the hereinbefore described yeast No. 16 in a molasses mash and then rendering the mash alkaline by successive small doses of sodium carbonate totalling from about 20 to 35% of the fermentable sugar initially present, and completing the addition of carbonate within about 24 hours from the start of the fermentation.

5. The fermentation process which comprises subjecting a fermentable sugar solution to the fermenting action of the hereinbefore described yeast No. 16 and maintaining the fermentable sugar solution alkaline, after vigorous fermentation has become established therein, by adding, at intervals of at least 2 hours each, from about 3 to 8.5% of sodium carbonate based on the weight of fermentable sugar initially present, until the total quantity of carbonate added amounts to between 25 and 35% of the fermentable sugar initially present.

In testimony whereof I affix my signature.

FRANK A. McDERMOTT.